(12) United States Patent
Kuhlmann

(10) Patent No.: US 11,731,789 B2
(45) Date of Patent: Aug. 22, 2023

(54) HYBRID AIRSHIP AND RELATED ASSEMBLY AND/OR MAINTENANCE METHOD

(71) Applicants: TOTAL SA, Courbevoie (FR); FLYING WHALES, Suresnes (FR)

(72) Inventor: Hervé Kuhlmann, Montrouge (FR)

(73) Assignees: TOTAL SA, Courbevoie (FR); FLYING WHALES, Suresnes (FR)

( * ) Notice: Subject to any disclaimer, the term of this patent is extended or adjusted under 35 U.S.C. 154(b) by 261 days.

(21) Appl. No.: 16/763,624

(22) PCT Filed: Nov. 13, 2017

(86) PCT No.: PCT/IB2017/001549
§ 371 (c)(1),
(2) Date: May 13, 2020

(87) PCT Pub. No.: WO2019/092472
PCT Pub. Date: May 16, 2019

(65) Prior Publication Data
US 2020/0283170 A1 Sep. 10, 2020

(51) Int. Cl.
*B64F 5/40* (2017.01)
*B64B 1/22* (2006.01)
(Continued)

(52) U.S. Cl.
CPC .................. *B64F 5/40* (2017.01); *B64B 1/22* (2013.01); *B64B 1/24* (2013.01); *B64B 1/32* (2013.01);
(Continued)

(58) Field of Classification Search
CPC .... B64B 1/22; B64B 1/24; B64B 1/36; B64C 2201/00
See application file for complete search history.

(56) References Cited

U.S. PATENT DOCUMENTS 4,089,492 A * 5/1978 Lang ...................... B64B 1/005
244/30
5,294,076 A * 3/1994 Colting ..................... B64B 1/24
244/30

(Continued)

FOREIGN PATENT DOCUMENTS

CN 1202861 A 12/1998
DE 197 53 548 A1 8/1999

(Continued)

OTHER PUBLICATIONS

International Search Report issued in corresponding International Patent Application No. PCT/IB2017/001549 dated Apr. 13, 2018.

*Primary Examiner* — Philip J Bonzell
*Assistant Examiner* — Michael B. Kreiner
(74) *Attorney, Agent, or Firm* — Troutman Pepper Hamilton Sanders LLP

(57) ABSTRACT

The present invention concerns hybrid airship comprising at least one buoyancy enclosure containing a gas lighter than air, a gondola attached below the buoyancy enclosure, the gondola extending along a longitudinal axis, at least one propeller configured to propel the hybrid airship, the at least one propeller being attached to the buoyancy enclosure, at least one generator, configured to provide power to the propeller, the generator being connected to the gondola. The hybrid airship comprises an arm protruding from the gondola and connecting the generator to the gondola.

12 Claims, 3 Drawing Sheets

(51) Int. Cl.
*B64B 1/24* (2006.01)
*B64B 1/32* (2006.01)
*B64D 9/00* (2006.01)
*B64D 37/04* (2006.01)

(52) U.S. Cl.
CPC .............. *B64D 9/00* (2013.01); *B64D 37/04* (2013.01); *B64B 2201/00* (2013.01)

(56) References Cited

U.S. PATENT DOCUMENTS

| | | | | |
|---|---|---|---|---|
| 6,224,016 | B1 * | 5/2001 | Lee | B64B 1/14 244/30 |
| 6,349,683 | B1 * | 2/2002 | Annen | H02K 35/02 123/46 E |
| 8,393,580 | B2 * | 3/2013 | Droney | B64C 7/02 244/62 |
| 8,645,005 | B2 | 2/2014 | Elkins | |
| 8,814,081 | B2 * | 8/2014 | Gagne | B64D 41/00 244/54 |
| 8,967,531 | B2 * | 3/2015 | Gagne | B64D 33/04 244/58 |
| 9,640,959 | B2 * | 5/2017 | Pickard | H01R 13/658 |
| 10,870,479 | B2 * | 12/2020 | Courtin | B64C 39/024 |
| 11,001,379 | B2 * | 5/2021 | Panas | B64B 1/44 |
| 2011/0198438 | A1 | 8/2011 | Colting | |
| 2011/0267241 | A1 | 11/2011 | Grimm et al. | |
| 2016/0025075 | A1 | 1/2016 | Seifert | |

FOREIGN PATENT DOCUMENTS

| | | | |
|---|---|---|---|
| DE | 10 2006 028 855 A1 | 3/2007 | |
| DE | 102006028885 A1 * | 3/2007 | .............. B64B 1/20 |
| GB | 3635101 A | 7/1930 | |
| WO | 2010/006433 A1 | 1/2010 | |

* cited by examiner

HYBRID AIRSHIP AND RELATED ASSEMBLY AND/OR MAINTENANCE METHOD

CROSS REFERENCE TO RELATED APPLICATION

This is a U.S. National Phase Application under 35 U.S.C. § 371 of International Patent Application No. PCT/IB2017/001549, filed Nov. 13, 2017. The entire contents of which are hereby incorporated by reference.

FIELD OF THE INVENTION

The present invention concerns a hybrid airship comprising at least one buoyancy enclosure containing a gas lighter than air, a gondola attached below the buoyancy enclosure, the gondola extending along a longitudinal axis, at least one propeller configured to propel the hybrid airship and at least one generator, configured to provide power to the propeller, the generator being connected to the gondola.

BACKGROUND

The hybrid airship is in particular intended to carry heavy payloads to remote locations with a difficult access, in particular regions in which access by road is tedious or impossible.

For example, the payloads are used in oil and gas exploration activities in a remote region with a difficult access. The region in particular comprises a high density of vegetation, such as a forest, in particular a tropical forest. Also, the region may comprise rugged terrain such as hills (for example foothills), cliffs and/or mountains. The region may sometimes comprise dangerous to access areas, such as areas with unexploded ordinances (UXO's).

Generally, helicopters are used to carry payloads to such regions. Nevertheless, helicopters are expensive to operate and generate a high quantity of greenhouse gases. Helicopters are also very limited in the amount of payload they can carry.

SUMMARY

Hybrid airships of the above-mentioned type are a very efficient and environmentally friendly alternate. They are able to carry heavy payloads with minimal fuel consumption. They are silent and can be propelled with thermal generators providing electrical power to propellers.

Such hybrid airship nevertheless requires a regular maintenances and, in particular, maintenances of the generator which is a critical device for the good operation of the hybrid airship. The access for operators and equipment for the maintenance is difficult in the remote regions and the hybrid airships have to be continuously operational.

Generally, the generators are located in the gondola of the airship. An intervention on the generator requires entering the gondola and providing the maintenance inside the gondola, which is tedious and complicated.

DE 197 53 548 discloses an airship comprising a buoyancy enclosure and propellers, the propellers being powered by fuel cell generators which protrude, in an extension of the gondola, from a back surface of the gondola and are attached to the buoyancy element.

Nevertheless, such a solution is not entirely satisfactory. The generators being attached directly to the gondola and to the buoyancy element, the maintenance of the generators remain a complicated operation which is difficult to carry out in a remote location.

Moreover, in order to explore a region of interest, a hybrid airship sometimes comprises, in the gondola, several sensors in order to carry out measurements. These sensors are, for example, actives sensors such as electro-magnetic sensors, laser sensors (LIDAR) or infrared sensors or passive sensors measuring the gravitational field or the magnetic field. The vibrations created by the generators are directly transmitted to the gondola and may disrupt these sensitives sensors located in the gondola.

Also, the generators being located at the back of the gondola, they are not affected by the surrounding air flow when the airship is flying. The thermal cooling of the generator is therefore not efficient.

One aim of the invention is to obtain a hybrid airship allowing an easier maintenance of the generators in particular in remote places.

To this aim, the subject-matter of the invention is a hybrid airship of the above type, characterized in that the hybrid airship comprises an arm protruding from the gondola and connecting the generator to the gondola.

The hybrid airship according to the invention comprises one or more of the following features, taken solely, or according to any technical feasible combination:
the hybrid airship comprises two generators, the two associated arms protruding symmetrically from each side surface of the gondola;
each arm protrudes laterally from a side surface of the gondola along a transverse axis of the gondola;
each arm protrudes laterally from a top surface of the gondola;
each generator is configured to be reversibly assembled and disassembled from the arm in one piece and replaced as a single piece;
the arm comprises a fuel tank, configured to store fuel to power the generator;
the generator has an ovoid shape;
the length of the arm taken from the side surface of the gondola to the generator is greater than 0.6 m;
the height between the bottom of the gondola and the bottom of the generator is comprised between 0.2 m and 0.8 m;
the hybrid airship comprises a payload carrying apparatus deployable from the gondola to carry a payload below the gondola;
the at least one propeller is attached to the buoyancy enclosure with a mast structure;
the hybrid airship comprises a plurality of propellers, each propeller of the hybrid airship being attached to the buoyancy enclosure;
no propeller of the hybrid airship is attached to the arm and/or to the generator.

The invention further concerns an assembly and/or maintenance method for of a hybrid airship as defined above comprising:
immobilizing the gondola of the hybrid airship on the ground or in proximity to the ground;
carrying out an assembly and/or a maintenance of the generator at the end of the arm protruding from the gondola.

The method according to the invention comprises one or more of the following features, taken solely, or according to any technical feasible combination:
the maintenance of the generator comprises accessing the generator from the outer and/or the inner lateral side of the generator;

disassembling at least one generator in one piece from the arm;

assembling a new generator in one piece on the arm;

the generator is disassembled from the arm and assembled on the arm by unclipping/clipping.

BRIEF DESCRIPTION OF THE DRAWINGS

The invention will be better understood, upon reading of the following description, given solely as an example, and made in reference to the appended drawings, in which.

DETAILED DESCRIPTION OF THE DRAWINGS

Figure 1:
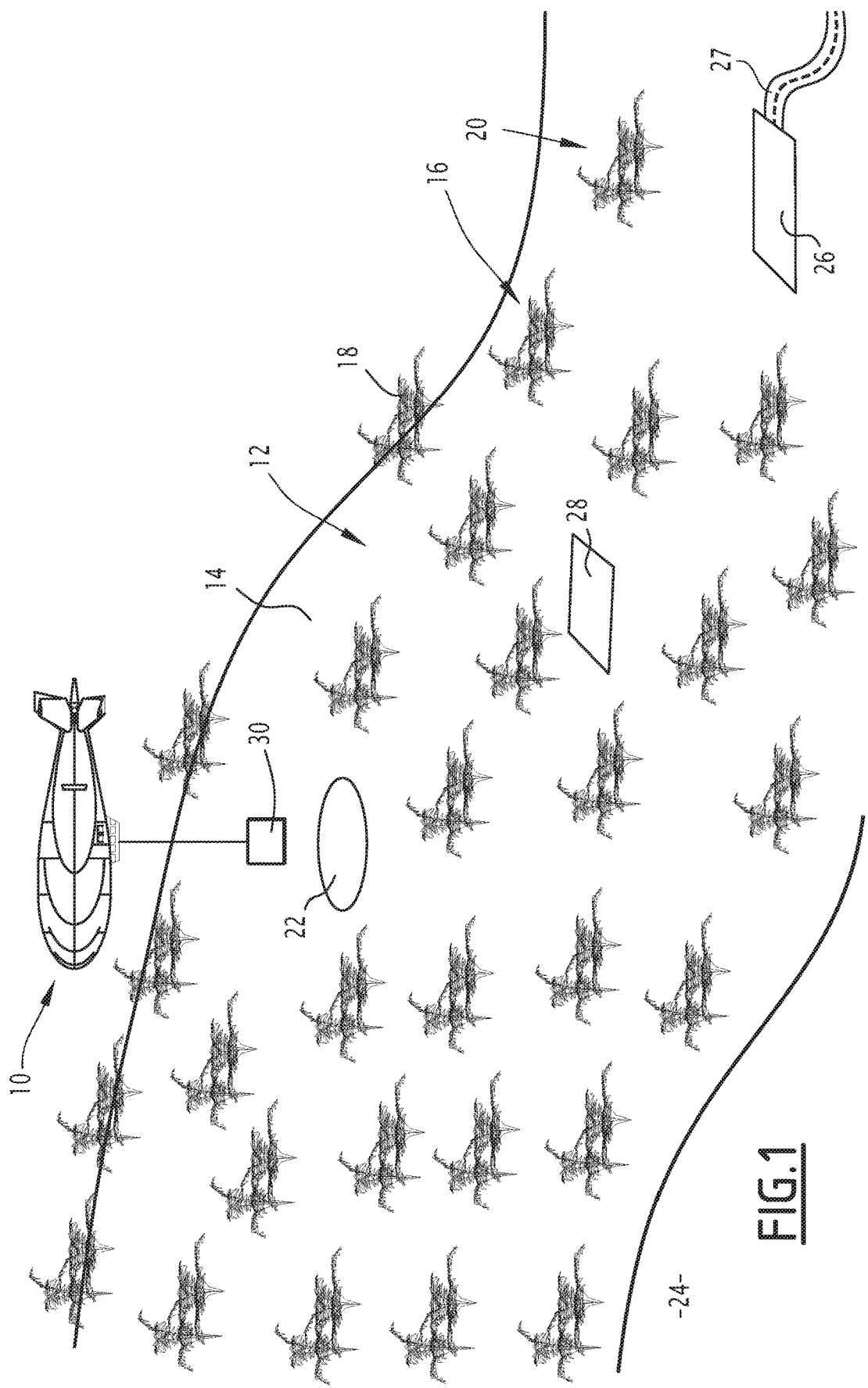
FIG. 1 is a schematic view of a region of interest.

A first hybrid airship 10 according to the invention, flying above a region of interest 12, is shown in FIG. 1.

The region of interest 12 is for example a region having an uneven terrain 14. The uneven terrain 14 in particular comprises hills, mountains, cliffs or any type of rugged terrain. The region of interest 12 is for example located on foothills which are difficult to access.

The region of interest 12 further comprises vegetation 16. The vegetation 16 is for example a forest, in particular a tropical forest. The region of interest here comprises a high density of vegetation, for example trees 18 forming a canopy 20 which covers a majority of the surface of the ground in the region of interest 12.

In the region of interest 12, the vegetation 16 defines a plurality of natural and/or artificial clearings 22.

The clearings 22 are spread in the region of interest 12, at a distance generally comprised between 100 m and 500 m, preferentially around 300 m, taken along the line of sight between two adjacent clearings 22.

The clearings 22 generally have a surface area greater than 25 m², at the ground level and generally greater than 900 m² at the top of the canopy 20.

A clearing 22 is for example defined in a OGP Standard "OGP-Helicopter Guideline for Land Seismic and Helirig operations—Report 420 version 1.1 June 2013.

The subsurface 24 located below the ground comprises layers of geological formation and potentially oil and gas reservoirs.

In order to carry out an exploration or an exploitation of the oil and gas reservoirs, the region of interest 12 comprises at least a base camp 26 and a secondary camp 28. The base camp 26 and the secondary camp 28 are separated from a distance generally comprised between 5 km and 20 km, preferentially around 10 km.

The base camp 26 is advantageously accessible by a road 27. The equipment and necessities are provided to the base camp 26 for example by trucks driving on the road 27.

The secondary camp 28 is closer from the clearings 22 than the base camp 26 and is not accessible by any road.

The secondary camp 28 and the clearings 22 are separated from a distance generally comprised between 200 m and 10 km, preferentially around 5 km.

The hybrid airship 10 is configured to take off from the ground, to fly in the surrounding air and to land on the ground.

Figure 3:
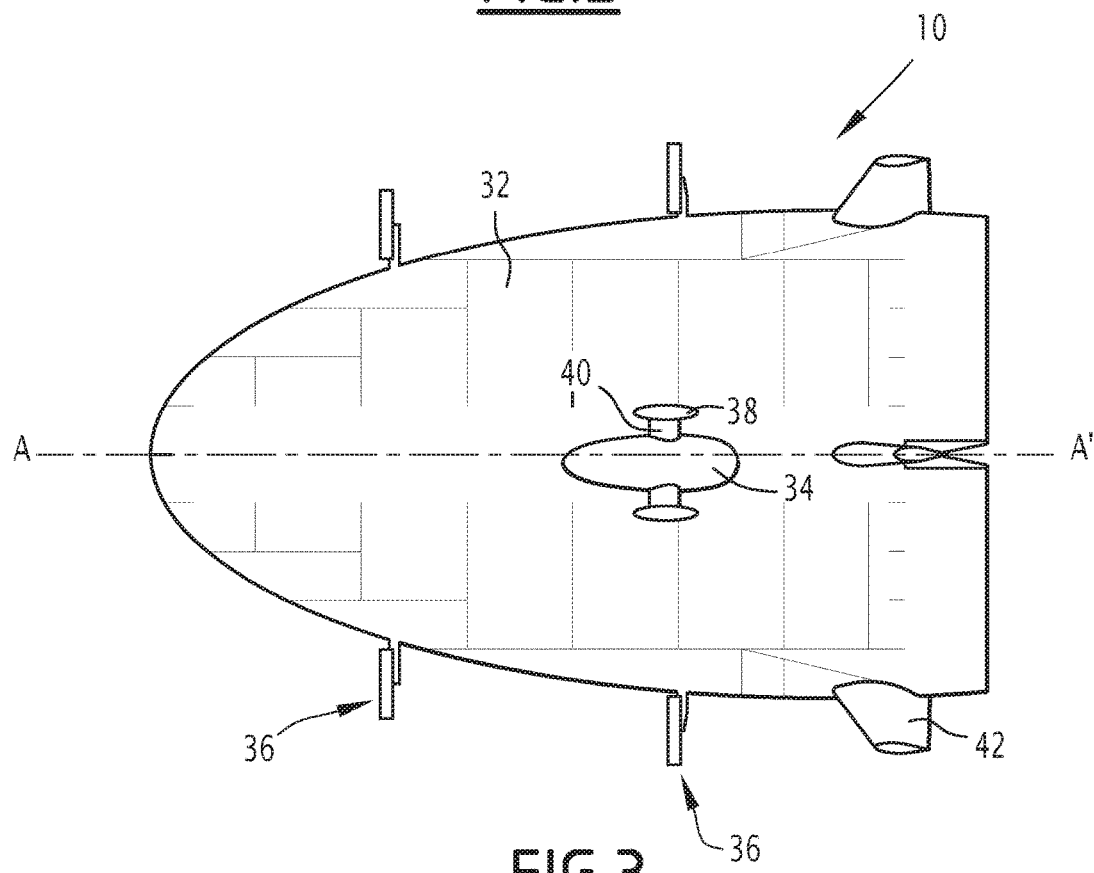
FIG. 3 is a bottom view of the first hybrid airship according to the invention.

As shown in FIG. 3, the hybrid airship 10 extends along a longitudinal axis A-A'.

The hybrid airship 10 is configured to take-off and land substantially, vertically and to move substantially along the longitudinal axis A-A' during the flight.

The hybrid airship 10 is configured to carry a payload 30 from the base camp 26 to the secondary camp 28 and, vice versa, from the secondary camp 28 to the base camp 26.

The hybrid airship 10 may also be used to carry the payload 30 from the secondary camp 28 to the clearings 22 and, vice versa, from the clearings 22 to the secondary camp 28.

The payload 30 transported from the base camp 26 to the secondary camp 28 is for example camp equipment such as tents, water supply, fuel or food. It also comprises equipment for exploration and/or exploitation of oil and gas, such as seismic equipment and/or drilling equipment.

The payload 30 transported from the secondary camp 28 to the base camp 26 is for example camp wastes, or used equipment.

The payload 30 transported from the secondary camp 28 to the clearings 22 is for example seismic equipment for exploration and/or drilling equipment.

The payload 30 may include in some instances an injured or sick worker for medical evacuation.

The hybrid airship 10 is configured to carry a payload 30 weighing advantageously between 0 tons and to 2 tons.

Figure 2:
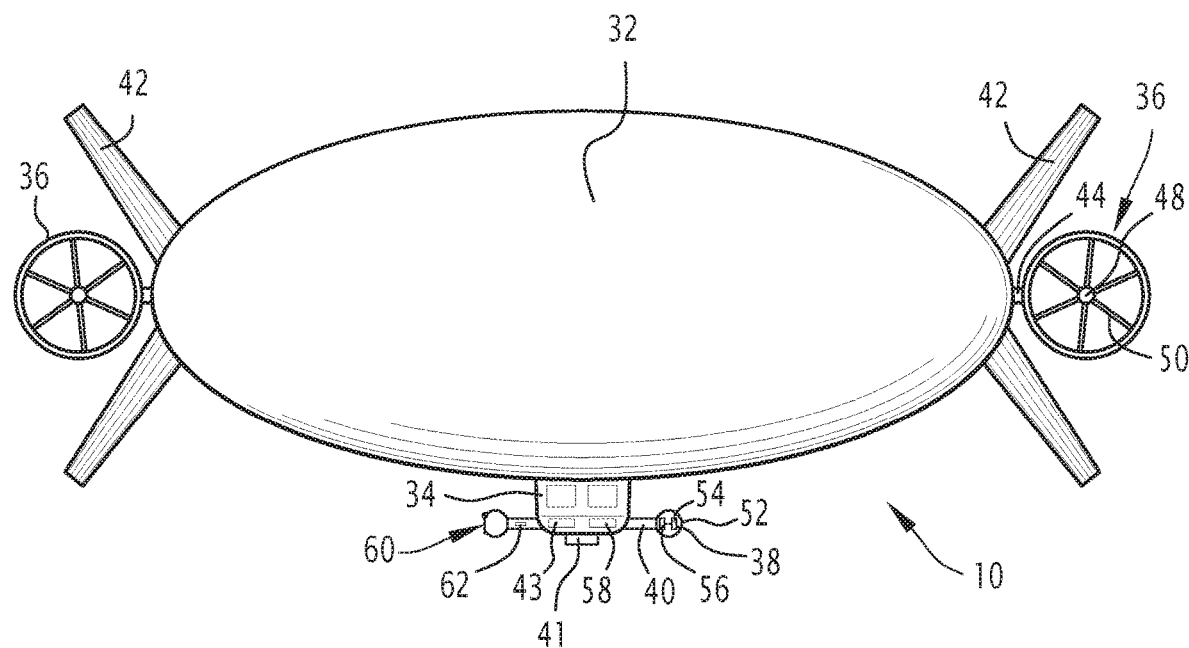
FIG. 2 is a side view of a first hybrid airship according to the invention.

As shown in FIG. 2 and FIG. 3, the hybrid airship 10 comprises a buoyancy enclosure 32, a gondola 34 attached below the buoyancy enclosure 32, at least one propeller 36, at least one generator 38 providing power to the or each propeller 36 and for each generator 38, an arm 40 connecting the generator 38 to the gondola 34.

Advantageously, the hybrid airship 10 comprises a payload carrying apparatus 41.

The buoyancy enclosure 32 contains a gas lighter than air, meaning that the gas has a density lower than the surrounding air at 20° C. and 1 atm. The gas is advantageously helium.

When filled with the gas lighter than air, the buoyancy enclosure 32 provides positive buoyancy in air of the hybrid airship 10.

The buoyancy enclosure 32 extends along the longitudinal axis A-A'.

The buoyancy enclosure 32 here has a wing shape with an ovoid contour, taken in a plane transverse to axis A-A'. The ovoid contour limits the aerodynamic drag.

When the airship 10 is horizontal, the ratio between the maximal vertical height of the buoyancy enclosure 32 taken perpendicularly to axis A-A' and the maximal length of the buoyancy enclosure 32 taken along the longitudinal axis A-A' is comprised between 20% and 35%.

In a horizontal section, the ratio between the maximal transverse width of the buoyancy enclosure 32 and the maximal length of the buoyancy enclosure 32 is comprised between 25% and 35%.

The buoyancy enclosure 32 advantageously comprises at least one rudder 42 protruding from the buoyancy enclosure 32 and located at the back of the buoyancy enclosure 32.

The rudder 42 is configured to stabilize and improve the directional control of the hybrid airship 10.

The gondola 34 extends along the longitudinal axis A-A'.

Advantageously, the horizontal section of the gondola 34 is oval in order to have an aerodynamic shape limiting the aerodynamic drag.

The gondola 34 is advantageously made of a composite material. For example, the gondola 34 is made of carbon fiber sandwich panels.

The length of the gondola 34 is comprised between 5 m and 10 m, preferentially 7 m.

The width of the gondola 34 is comprised between 1 m and 3 m, preferentially 2 m.

This allows the gondola 34 to be easily inserted in a standardized container.

The height of the gondola 34 is comprised between 1.5 m and 3 m, preferentially 2 m.

The gondola 34 advantageously comprises a cockpit for the pilot of the hybrid airship 10, a cabin to transport passengers or a load, at least one side door and on-board electrical systems 43.

Each propeller 36 is configured to propel the hybrid airship 10.

The propeller 36 is advantageously attached to the buoyancy enclosure 32 by a mast structure 44 protruding laterally from the buoyancy enclosure 32.

The hybrid airship 10 advantageously comprises at least two propellers 36, for example four propellers 36 placed symmetrically on each side of the buoyancy enclosure 32. Each propeller 36 here comprises an electrical motor 45, a rotor 48 and several propeller blades 50 protruding from the rotor 48 in a tubular guide. When the generator 38 provides electrical power to the electrical motor 48, the electrical motor 48 is rotating the rotor 48 and the blades 50 to create an air flow along the tubular guide.

The propellers 36 are able to propel the hybrid airship 10 at an air speed up to 100 km/h, and generally at a cruise air speed of substantially 60 km/h.

The hybrid airship 10 is said "hybrid" because its lift is ensured by aerostatic lift due to the buoyancy of the buoyancy enclosure 32 comprising a gas lighter than air, advantageously aerodynamic lift due to the specific wing-like shape of the buoyancy enclosure 32 and potentially vertical thrust due to the propellers 36.

The generator 38 provides electrical power to each propeller 36. It is remote from each of the propellers 36.

The generator 38 and each associated propeller 36 are electrically connected through electrical cables running within the arm 40 and the gondola 34, via the electrical power distribution system 58, along the external surface of the buoyancy enclosure 32.

The generator 38 is deprived of propeller attached to the generator 38.

Advantageously, the generator 38 extends along the longitudinal axis A-A', apart from the gondola 34.

The generator 38 here has an ovoid shape, the ovoid shape limiting the aerodynamic drag.

The generator 38 comprises an inner lateral side and an outer lateral side. The inner lateral side is defined as the side of the generator 38 located facing the gondola 34. The outer lateral side is defined as the side of the generator 38 located opposite to the gondola 34.

The length of the generator 38 is comprised between 1 m and 3 m, preferentially 2 m.

The width and the height of the generator 38 are, advantageously, substantially equal and are comprised between 0.6 m and 1.2 m, preferentially 0.5 m.

The generator 38 comprises a housing 52, at least one motor 54 and at least one alternator 56. Each motor 54 and each alternator 56 are located inside the housing 52. The motor 54 is preferably a thermal motor. It is fueled by oil, gas or hydrogen. In a variant, the generator 38 is a chemical generator such as a fuel cell. The motor 54 is configured to produce mechanical energy from the chemical energy of the fuel.

Each alternator 56 is connected to one of the motors 54. The alternator 56 is configured to produce electrical energy from the mechanical energy provided by the motor 54.

Each alternator 48 is connected to a primary electrical power distribution system 58 located in the gondola 34. The primary electrical power distribution system 58 is configured to provide electricity powering the on board electrical systems 43 and to each motor 45 of the propellers 36.

The housing 46 preferably defines at least a hatch 60 for accessing the motor 54 of the generator 38.

The generator 38 has a weight comprised between 150 kg and 300 kg, preferentially substantially equal to 220 kg.

The arm 40 protrudes from the gondola 34 and is configured to connect the gondola 34 and the generator 38.

The arm 40 is attached on the inner lateral side of the generator 38.

The arm 40 is deprived of propeller.

In the example of FIG. 2, the hybrid airship 10 comprises two generators 38 and two associated arms 40. The two arms 40 protrude symmetrically from each side surface of the gondola 34. In particular, each arm 40 protrudes laterally along a transverse axis of the gondola 34.

The length of the arm 40 taken from the side surface of the gondola 34 to the generator 38 is generally greater than 0.6 m.

The height between the bottom of the gondola 34 and the bottom of the generator 38 is comprised between 0.2 m and 0.8 m.

Therefore, the generator 38 is easily accessible for maintenance. The operator is able to directly access the generator 38 and does not have to enter the gondola 34.

Moreover, the vibrations created by the generator 38 do not affect the gondola 34, the generator 38 being separated from the gondola 34. The comfort of the pilot and the passengers in the gondola 34 is improved and the sensitives sensors located in the gondola 34 are not disrupted by the vibrations.

Finally, the cooling of the generator 38 is improved, the generator 38 being located in the surrounding air flow when the hybrid airship 10 is flying.

In an advantageous embodiment, the arm 40 comprises at least one fuel tank 62 located inside the arm 40. The fuel tank 62 is configured to store fuel to power the generator 38. The fuel is, for example, oil, gas or hydrogen.

Advantageously, the arm 40 comprises a pump to convey the fuel from the fuel tank 62 to the generator 38.

The fuel tank 62 is configured to store up to 200 kg of fuel. Advantageously, the generator 38 is reversibly assembled and disassembled from the associated arm 40 in one piece. The generator 38 is preferably replaced as a single piece.

The generator 38 is advantageously clipped on the associated arm 40 when assembled on the arm 40. Preferably, the housing 52, the motor 54 and the alternator 56 can be dismantled as a single unit from the arm 40, the arm 40 remaining a single unit and unclipped when disassembled The arm 40 is also reversibly assembled and disassembled from the gondola 34. The arm 40 is advantageously clipped on the gondola 34 and unclipped.

The maintenance of a deficient generator 38 is therefore easy and quick, as it will be explained below.

The payload carrying apparatus 41 is for example a hoisting system comprising at least a line deployed from the gondola 34 for example by a winch to carry a payload 30 below the gondola 34. The payload 30 is suspended from the hybrid airship 10 by the payload carrying apparatus 41.

A maintenance method of a hybrid airship 10 according to the invention will be now described. This method is for example carried out after a flight of the hybrid airship 10 to carry a payload 30.

When the maintenance is needed, for example as a preventive measure or to repair a generator 38, the hybrid airship 10 lands to the ground. The gondola 34 of the hybrid airship 10 is immobilized on the ground or in proximity to the ground, in hover flight.

Advantageously, the gondola 34 is immobilized at a distance less than 2 m from the ground.

The operator accesses the generator 38 from the outer and/or the inner lateral side of the generator 38 to carry out maintenance.

If needed, the operator disassembles the deficient generator 38 from the arm 40 without using any motorized equipment.

The operator disassembles the generator 38 from the arm 40, advantageously by unclipping.

Then, the operator assembles a new generator 38 in one piece on the arm 40.

The operator assembles the new generator 38 on the arm 40, advantageous, by clipping.

The maintenance of the generator 38 is easily and quickly performed without any motorized equipment and without a large workforce. The maintenance method is especially advantageous in the remote region of interest 12, the region of interest 12 having a difficult access for the equipment, lacking space for maintenance and having a limited operator workforce.

Figure 5:
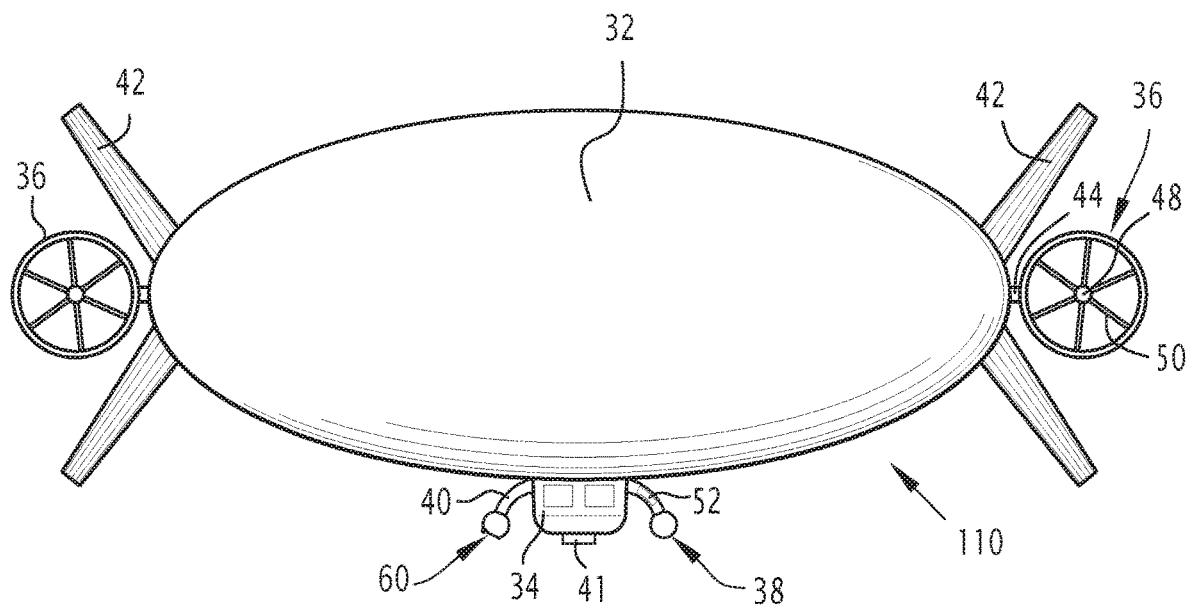
FIG. 5 is a side view of a second hybrid airship according to the invention.

A second hybrid airship 110 according to the invention is shown in FIG. 5.

The second hybrid airship 110 differs from the first hybrid airship 10 in that each arm 40 protrudes laterally from a top surface of the gondola 34.

Advantageously, the arm 40 has a curved C shape and extends towards the ground.

Thanks to the inclined shape of the arm 40, the arm 40 does not need a pump to convey the fuel stored into the tank 62. The gravity flow of the fuel enables a passive supply of the generator 38 which leads to a safer and less expensive fuel supply.

Figure 4:
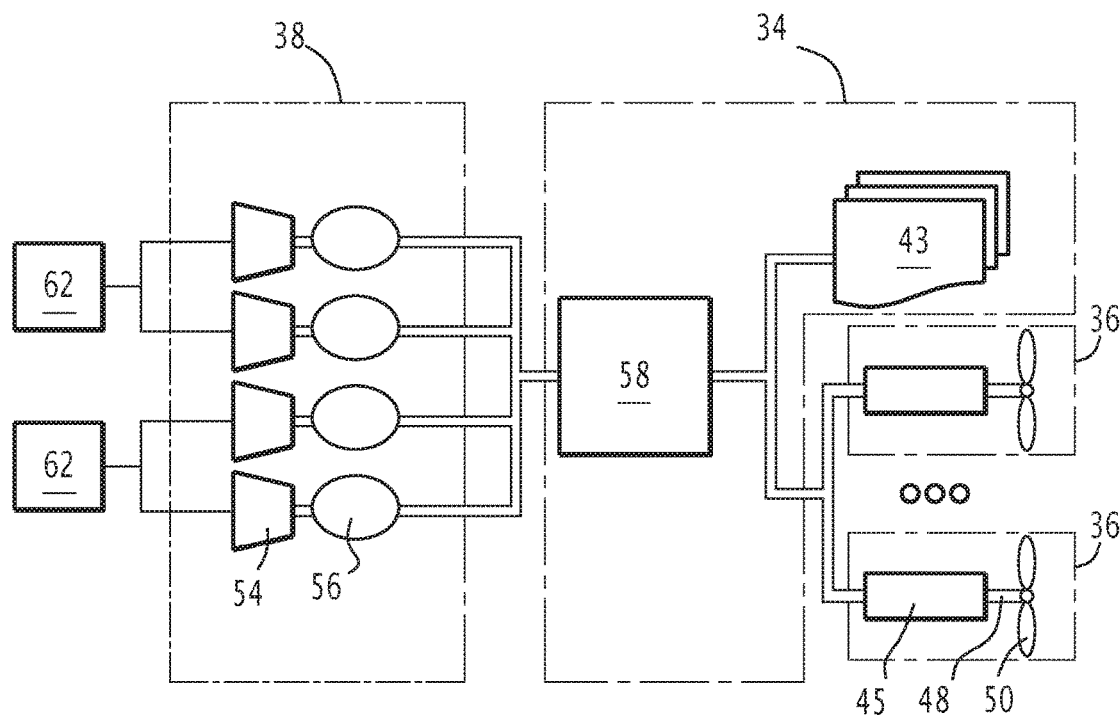
FIG. 4 is a schematic view of the electricity providing system of the first hybrid airship according to the invention.

In a variant, each generator 38 comprises two motors 54 and two alternators 56, as shown in FIG. 4. The motors 54 and alternators 56 are contained in the same housing 52. Each fuel tank 62 is configured to provide fuel to the two associated motors 54.

The invention claimed is:

1. A hybrid airship comprising:
at least one buoyancy enclosure containing a gas lighter than air;
a gondola attached below the buoyancy enclosure, the gondola extending along a longitudinal axis;
at least two propellers configured to propel the hybrid airship, the at least one propeller being attached to the buoyancy enclosure; and
two generators, configured to provide power to the propellers;
wherein the hybrid airship comprises two arms protruding symmetrically from each side surface of the gondola and each connecting one of the two generators to the gondola,
wherein each generator is configured to be reversibly assembled and disassembled from the arm in one piece.

2. The hybrid airship according to claim 1, wherein each arm protrudes laterally from a side surface of the gondola along a transverse axis of the gondola.

3. The hybrid airship according to claim 1, wherein each arm protrudes laterally from a top surface of the gondola.

4. The hybrid airship according to claim 1, wherein the arm comprises a fuel tank, configured to store fuel to power the generator.

5. The hybrid airship according to claim 1, wherein the generator has an ovoid shape.

6. The hybrid airship according to claim 1, wherein the length of the arm taken from the side surface of the gondola to the generator is greater than 0.6 m.

7. The hybrid airship according to claim 1, wherein the height between the bottom of the gondola and the bottom of the generator is comprised between 0.2 m and 0.8 m.

8. The hybrid airship according to claim 1, comprising a payload carrying apparatus deployable from the gondola to carry a payload below the gondola.

9. An assembly and/or maintenance method of an hybrid airship according to claim 1, comprising:
immobilizing the gondola of the hybrid airship on the ground or in proximity to the ground; and
carrying out an assembly and/or a maintenance of the generator at the end of the arm protruding from the gondola.

10. The method according to claim 9, wherein the maintenance of the generator comprises accessing the generator from the outer and/or the inner lateral side of the generator.

11. The method according to claim 9 comprising:
disassembling at least one generator in one piece from the arm; and
assembling a new generator in one piece on the arm.

12. The method according to claim 11, wherein the generator is disassembled from the arm and assembled on the arm by unclipping/clipping.

* * * * *